Jan. 8, 1952 R. O. DAVIS 2,581,579
CONCRETE PRODUCT MOLDING MACHINE
Filed Sept. 28, 1948 3 Sheets-Sheet 1
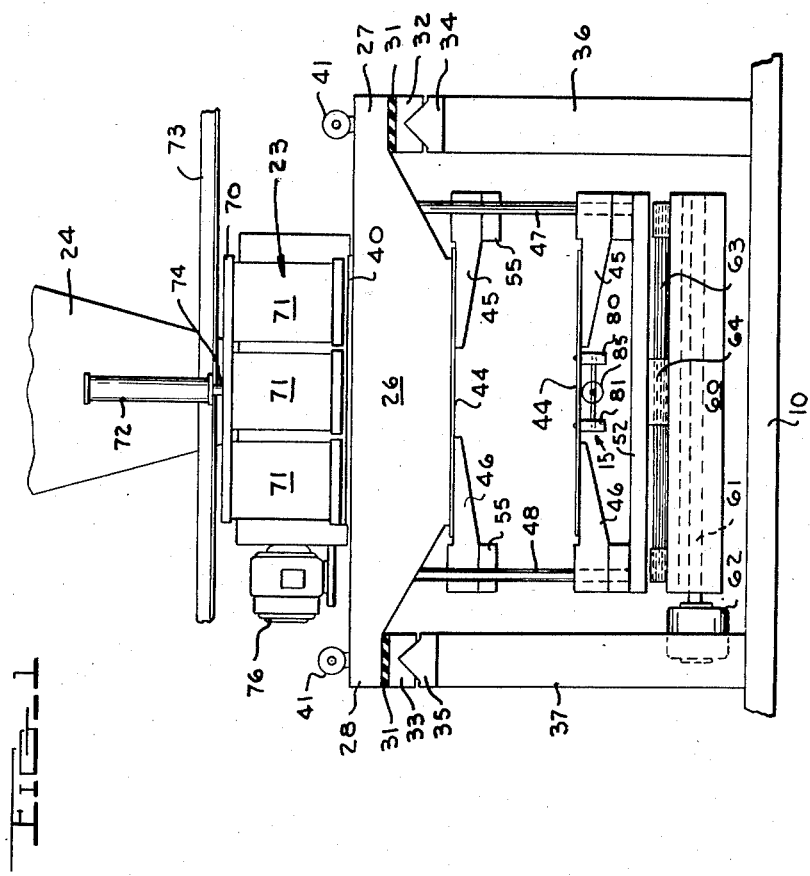
INVENTOR.
ROBERT O. DAVIS
BY
ATTORNEY Jan. 8, 1952 R. O. DAVIS 2,581,579
CONCRETE PRODUCT MOLDING MACHINE
Filed Sept. 28, 1948 3 Sheets-Sheet 2
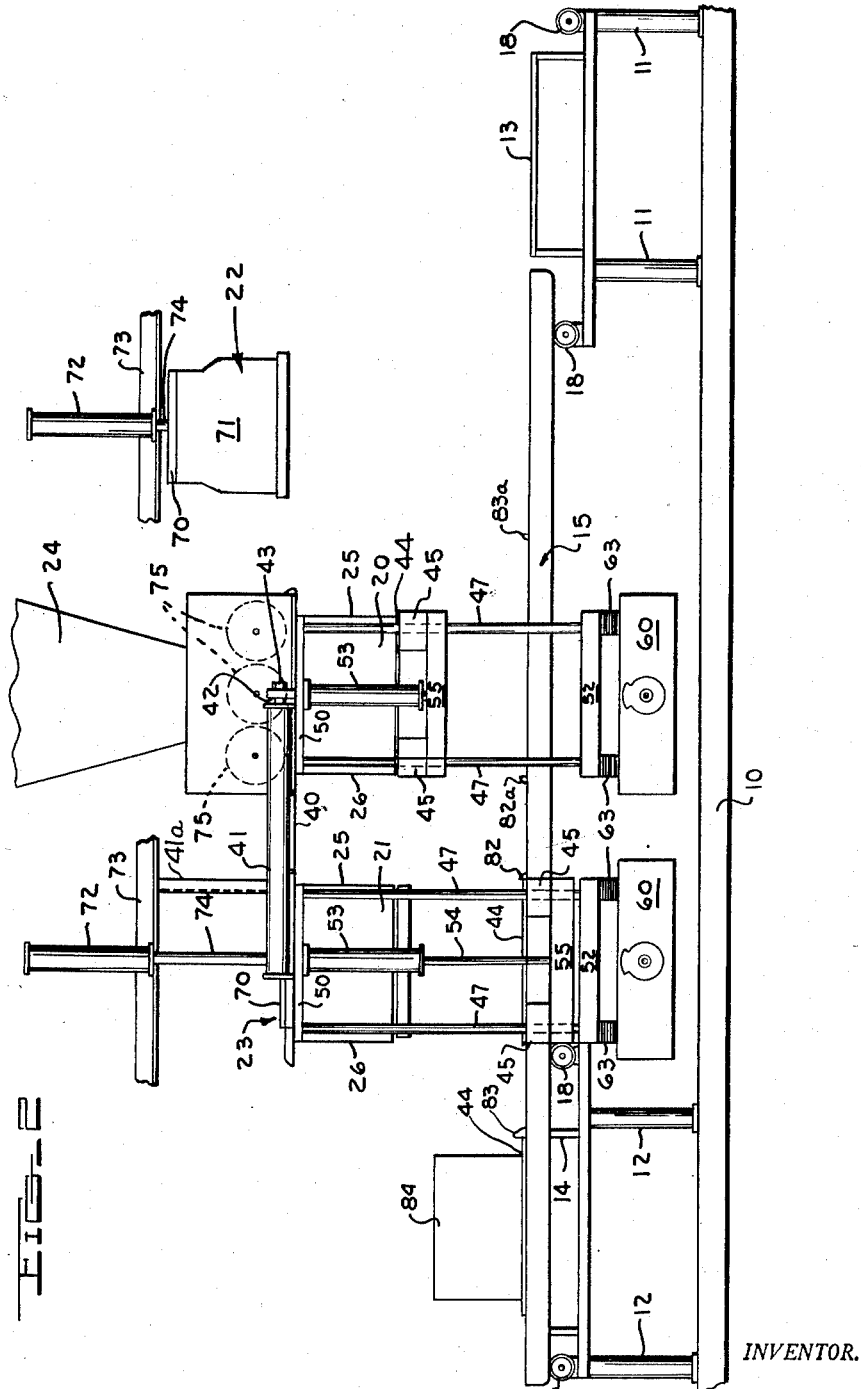
INVENTOR.
Robert O. Davis
BY Arthur N. Smith
ATTORNEY

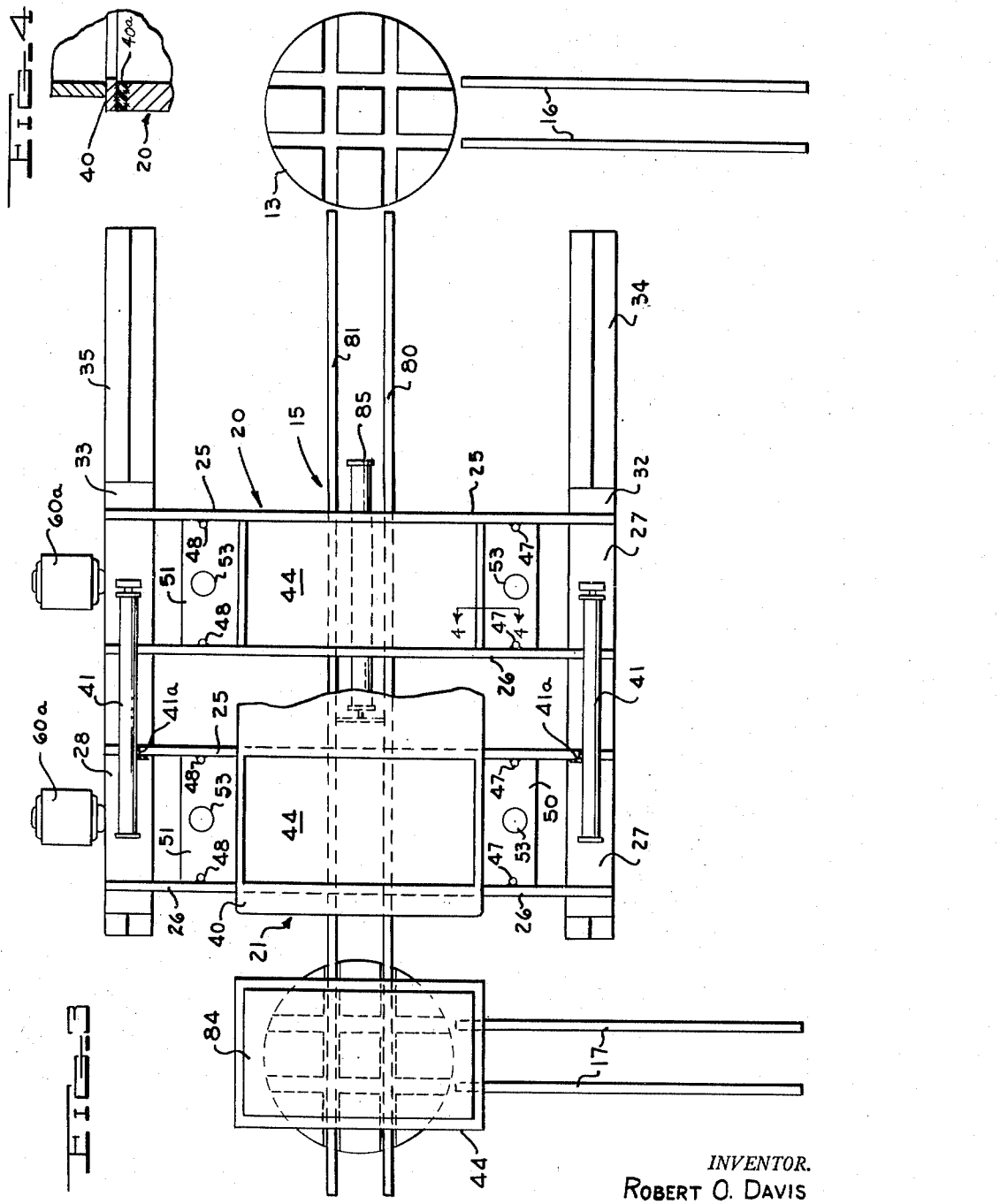

Patented Jan. 8, 1952

2,581,579

UNITED STATES PATENT OFFICE 2,581,579

CONCRETE PRODUCTS MOLDING MACHINE

Robert O. Davis, Adrian, Mich., assignor to Gene Olsen Corporation, Adrian, Mich., a corporation of Michigan Application September 28, 1948, Serial No. 51,553

12 Claims. (Cl. 25—41)

The present invention relates to a molding machine for molding plastic materials such as concrete products and more particularly to such a machine in which one or more molds are moved through a timed machine cycle in which a pallet is provided for the mold, the mold is moved to a filling station, vibrated and filled with a concrete mix of moldable consistency, the filled mold is moved while being vibrated to a finishing station where the concrete mix is molded into final form for removing from the mold after which the pallet and molded but uncured mix is removed from the mold and the machine cycle is repeated.

The prior Gelbman Patent No. 2,431,034 discloses a molding machine for the manufacture of bricks and similar materials. In this machine, a vibrating table is employed. The mold is filled while on the table which is vibrated to densify the material adjacent the bottom of the mold. The filled mold is moved from the vibrating table over a pallet which closes the bottom of the filled and partially compacted mold at the compression station where it is held while pressure and vibration is applied to compact the material in the top of the mold. Since the vibrating table acts chiefly on the material in the bottom of the mold and the vibrating pressure head acts chiefly on the material in the top of the mold, it will be seen that the molded material has its greatest density on the top and bottom portions thereof.

As distinguished from the said Gelbman patent, the machine of the present invention utilizes a mold having a vibrator connected directly therewith which is operated to vibrate the entire mold during the filling of the mold and while the mold is in motion and at the finishing station in order thereby to assure a substantially uniform density throughout the mass of the molded material. The pallet is utilized as an integral part of the mold and may either be locked against the bottom of the mold, in which instance it is removable therefrom to permit the removal of the molded mix through the bottom of the mold, or, if desired, a cored pallet shaped like the bottom surface of the unit to be molded may be fed into the mold from the top of the mold, in which case the finished unit is removed from the mold by pushing the pallet and block up through the top of the mold. In either instance, the mold is vibrated at all times during the filling, the movement of the filled mold to the finishing station, and during the compaction of the material at the finishing station.

It is an important object of the present invention to provide a molding machine in which a vibrating mold is provided which is filled while vibrating with a mix of moldable consistency which is compacted to a substantial extent during the filling operation and is then moved to a finshing station where the mix in the filled mold is finally compacted and the pallet and finally molded mix are then removed from the mold.

It is a further object of the present invention to provide a molding machine of novel design which may utilize a plurality of separate molds to permit the simultaneous manufacture of a plurality of molded products of different sizes and shapes on a single machine.

It is a further object of the present invention to provide a concrete products molding machine of novel and simplified design and in which the mold boxes are each mounted on a separate carriage and provided with separate vibrators whereby vibration is localized in the mold boxes and their carriage and is effectively blocked off from other portions of the machine.

It is a further object of the present invention to provide a concrete products molding machine having an automatically timed power actuated cycle which provides a high volume output of molded products per man hour.

It is a further object of the present invention to provide a concrete products molding machine of novel, rugged, and compact construction in which relatively few moving parts are provided and in which wear on such moving parts is held to a minimum to provide a machine having a long, useful service life.

It is a further object of the present invention to provide a concrete products molding machine having a novel mold box and pallet assembly which permits feeding the pallet to the bottom of the mold box and the removal of the compressed molded concrete mix and pallet from the bottom of the mold box, thus facilitating the removal of the pallet and the compressed uncured molded material from the machine.

It is a further object of the present invention to provide a concrete products molding machine having a feed hopper whose open mouth portion is mounted above a reciprocating mold box connected with a sliding gate member for selectively closing the open mouth of said feed hopper except when a mold is in filling position thereunder.

It is a further object of the present invention to provide a concrete products molding machine in which the vibrating, reciprocating mold boxes are carried on a carriage movable on a track extending from the filling station to the finishing station whereby the mold boxes, while vibrating, are alternately reciprocated between said stations to permit the simultaneous filling of one box and compaction of the mix in a previously filled box, thus providing a machine of relatively high output capacity.

Other objects of this invention will appear in the following description and appended claims, reference being had to the accompanying drawings forming a part of this specification wherein like reference characters designate corresponding parts in the several views.

In the drawings:

Fig. 1 is an end elevation showing a molding machine embodying the present invention with certain parts of the machine structure being partially shown.

Fig. 2 is a front elevation of the machine shown in Fig. 1 with certain of the structural parts being partially shown.

Fig. 3 is a top plan of the machine shown in Figs. 1 and 2.

Fig. 4 is a fragmentary sectional view of the machine, taken substantially along the line 4—4 of Fig. 3.

Before explaining the present invention in detail it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

A molding machine embodying the present invention is shown in the accompanying drawings as applied to the manufacture of concrete products and comprises a plurality of inter-related machine elements, power actuated in timed relation to each other to provide a work cycle which includes feeding a removable pallet to the mold, filling the mold with a concrete mix, moving the filled mold to a finishing station where compaction of the material in the mold is completed and then removing the pallet with the compacted mix to unload the mold for the next cycle. Controlled vibration of the mold boxes is utilized at all times during the mold filling operation and during the final compaction of the materials therein. The machine shown in the drawings and to be hereinafter more fully described is a concrete block machine adapted to produce structural concrete blocks having a hollow cored central portion surrounded by solid walls which are centrally connected by a plurality of webs extending across said cored central portions. The mold boxes and finishing heads here shown and the magnitude of the movement of the machine parts as indicated in the drawings are particularly designed to produce such structural concrete blocks. It is to be understood, however, that a machine embodying the principles of the present invention may be readily adapted for the production of other forms of molded concrete products by providing mold boxes and pallets suited to the production of such other products and by adjusting the timing and the magnitude of movements of the machine elements to suit such changed requirements.

Referring to the drawings and particularly to Fig. 3, the numeral 10 designates a base on each end of which is mounted track supports 11 and 12 which support the turntables 13 and 14 respectively which provide a rotatable connection between the tracks of the reciprocating table 15 and the unloading tracks 16 and 17 provided at each end of the reciprocating table 15. Each of the supports 11 and 12 is provided with a plurality of anti-friction load carrying rollers 18 which support the ends of the reciprocating table 15 at all times during its movements.

The machine shown in the drawings utilizes two mold boxes 20 and 21 and two finishing heads 22 and 23. It is to be understood however, that additional mold boxes and additional finishing heads may be employed if desired.

As viewed in Fig. 2, the finishing heads 22 and 23 are located on the right and left sides respectively of a centrally located feed supply hopper 24.

The mold boxes 20 and 21 are each mounted in an identical manner on cross heads 25 and 26 which may also form two of the sides of the mold boxes. The mold boxes 20 and 21 are closed at their ends, but are open both at the top and the bottom. Any suitable conventional type of core member may either be secured in the mold boxes 20 and 21 or provided as a part of the removable pallet element as desired. Since such core members are of conventional construction and as such are known to those skilled in this art, the details thereof are omitted from the drawings and the description herein.

As shown in Fig. 1, the cross heads 25 and 26 are each provided with end portions 27 and 28 which are mounted respectively on pads 30 and 31 of resilient, vibration absorbing material through which the cross heads 25 and 26 are connected with the moveable inverted V-shaped ways 32 and 33 which are supported for sliding movement on fixed ways 34 and 35 which are mounted respectively on a plurality of supporting posts 36 and 37 fixed to the base 10. If desired, any suitable conventional type of anti-friction connection may be provided between the sliding ways 32 and 33 and fixed ways 34 and 35.

The fixed ways 34 and 35 thus provide an elevated track which extends longitudinally of both the front and back portions of the base 10 and which is supported in vertically spaced relation thereto. The moveable ways 32 and 33 and the cross heads 25 and 26 provide a moveable carriage which travels as a unit on the fixed ways 34 and 35 in a reciprocating movement which carries the mold boxes 20 and 21 from the filling position below the feed hopper 24 to the finishing station below the finishing heads 22 and 23. The mold boxes 20 and 21 are resiliently attached by a rubber washer 40a at their adjacent top edges to a gate 40 which slides directly under the open bottom of the feed hopper 24. The washer 40a is preferably bonded to both the mold box and the gate 40. Any suitable type of resilient attachment may be used which will connect the mold boxes 20 and 21 and the gate 40 for movement as a unit and which will insulate the gate 40 against vibrations transmitted from said mold boxes. The portion of the gate 40 which extends between the mold boxes 20 and 21 is of such a size that it will cut off the flow of material through the open bottom of the feed hopper 24 except when an empty mold box is in its filling position directly below said open bottom portion.

The mold boxes 20 and 21 and the gate 40 are reciprocated relative to the feed hopper by a plurality of synchronized power actuated cylinders 41 which are suitably mounted above and parallel to the fixed ways 34 and 35 and are connected with a fixed portion of the frame of the machine. Each of the cylinders 41 has a piston (not shown) and connecting rod whose end 42 is connected by a suitable connector 43 with the movable ways 32 and 33.

Actuation of the cylinders 41 to effect movement of the piston and the connecting rod is by any desired type of pressure fluid and is controlled by any conventional type of pressure fluid cam actuated control valve. Such controls and valves are conventional and are therefore omitted from the present drawings and disclosure.

The open bottom of each of the mold boxes 20 and 21 is closed during the filling and finishing operation by a removable pallet 44 which, in the embodiment of the invention here shown, is supported on pairs of vertically moveable pallet support arms 45 and 46 which are mounted for vertical sliding movement on pairs 47 and 48 of parallel spaced depending guide rods, the upper ends of each pair of which are secured respectively to the cross heads 50 and 51.

The lower ends of each of the pairs 47 and 48 of the depending guide rods extend below the reciprocating table 15 and are connected to a bottom plate 52. Each pair 45 and 46 of the pallet support arms is moved vertically by a fluid power actuated cylinder 53 whose upper end is secured to one of the cross heads 50 or 51 and whose connecting rod 54 is connected with the crosstie 55 which is connected with each pair 45 and 46 of the pallet support arms. The cross heads 50 and 51 are rigidly secured to the cross heads 25 and 26, such as by welding. By this construction, extension or retraction of the connecting rod 54 by movement of the movable piston in the cylinder 53 in response to the flow of pressure fluid thereto will lower or raise the pallet 44 as required for the operation of the machine.

The pallets 44 are raised to close the bottom of the mold boxes 20 and 21 prior to the filling thereof and are held in place thereon by the pairs of pallet support arms 45 and 46 which are provided on the opposite sides of the pallet. Any suitable type of conventional locking devices (and hence not shown) may be employed to hold the pairs 45 and 46 of the pallet support arms in position to hold the pallet 44 tightly in place on the bottom of the mold boxes 20 and 21 during the filling thereof and during the compression of the material therein.

As shown in Fig. 1, each of the pallet support arms is extended to undelie a major portion of each side edge of the pallet 44 and thus to take a large portion of the load to which the pallet is subjected during the compaction of the material in the mold boxes 20 and 21.

Each of the mold boxes 20 and 21 is subjected to high frequency vibration during the filling of the mold boxes and during the finish molding of the concrete mix therein. The vibrations utilized are generated by any suitable type of power driven vibrator which preferably is connected with the bottom plate 52. The power driven vibrator shown in the drawings is one preferred type and comprises a vibrator housing 60 in which a rapidly rotating unbalanced shaft 61 is mounted. The rapidly rotating unbalanced shaft 61 is power driven by any suitable means, such for example as a high speed electric motor 62. The vibrations thus developed are of high frequency but of relatively low magnitude. The vibrator housing 60 is therefore suspended from the ends 63 of a plurality of leaf springs. Each of the said leaf type springs is connected midway of its ends with a saddle 64 which is secured to the bottom plate 52.

Thus, upon operation of the motor 62, the unbalanced shaft 61 is rapidly rotated and sets up the primary vibrations of high frequency but of low magnitude in the vibrator housing 60. The magnitude is increased by the leaf type springs and the resultant vibration forces are transmitted to the bottom plate 52 and through the slide rods 47 and 48 to the mold boxes 20 and 21. Since the cross heads 25 and 26 are mounted on the pads 30 and 31 of the resilient vibration absorbing material, it will be seen that the vibration is localized in the mold boxes and the moveable mold box carriage assembly.

By controlling the actuation of the motor 62 through suitable conventional types of switches and relays (not shown) the actuation of the vibrator is timed so that the mold boxes 20 and 21 are vibrated after the pallet 44 is in position to close the bottom and after the mold box is moved to the filling position. The vibration is started during the filling operation. It is utilized during the movement of the filled mold box to the finishing station and during the finishing operation. The vibration is preferably discontinued as soon as the molding of the material in the mold boxes is completed. This tends to prevent breakage or crumbling of the molded but uncured material as it leaves the mold.

Each of the finishing heads 22 and 23 comprises a solid top plate 70 to which is secured a plurality of spaced depending plungers 71 which are of suitable size, shape and placement to fit in the open portion of the mold boxes 20 and 21 and surround the core portions therein. The finishing heads 22 and 23 act as retaining members when moved into the mold boxes 20 and 21 and hold the concrete mix therein during the finishing of the molding operation. Some pressure is exerted by the heads on the material in the mold boxes 20 and 21, but is not relied upon to complete the compaction of the mix. This is accomplished chiefly by the continued vibration of the mold boxes while the mix is held against movement therein by the finishing heads 22 and 23. The finishing heads 22 and 23 in addition, provide a finished surface on the compacted mix and, in the present machine, also act as rams to assist in removing the mix and pallet from the mold. Each of the finishing heads 22 and 23 is bodily moveable vertically relative to the mold boxes 20 and 21 to such an extent that the plungers 71 are completely withdrawn from the tops of the mold boxes 20 and 21 after ejection of the finished molded material therefrom. This permits free sliding movement of the mold boxes 20 and 21 from the finishing station to the filling station and vice versa.

Each of the finishing heads 22 and 23 is actuated by a fluid pressure actuated cylinder 72 mounted on a fixed cross beam 73 forming a structural part of the machine. The movable piston in the cylinder 72 is connected with one end of a connecting rod 74 whose other end is fixed to the top plate, 70. Pressure fluid is supplied to the cylinder 72 through any suitable system of conventional control valves (not shown) which are actuated by any desired type of timing means (not shown) to effect actuation of the cylinder 72 to raise or lower the finishing heads 22 and 23 in timed relation to the sliding movement of the mold boxes 20 and 21 and to exert such controlled pressures thereon as may be required to finish the molding of the mix and to unload the mold.

The feed hopper 24 is provided with a plurality of separate baffle type rotating agitators 75 located in the discharge throat thereof. The agitators 75 are driven by any suitable power means such for example as an electric motor 76 which is connected therewith through any suitable conventional drive gear mechanism (not shown). The agitators 75 are rotated during the filling of the molds 20 and 21 to prevent sticking or bridging of the concrete mix in the throat or mouth portion of the hopper 24 and thus assure a positive filling of the mold boxes 20 and 21 with the proper amount of the concrete mix during each filling operation.

After completion of the finish molding operation, the pallet 44 is lowered by the pallet support arms 45 and 46 as the finishing head in the mold is moved downwardly in synchronism therewith. This unloads the mold and the pallet 44 and the molded material thereon is placed on the reciprocating table 15 which includes the spaced, connected parallel side frames 80 and 81, the ends of which are supported for bodily movement on the anti-friction load carrying rollers 18. Pallet guide fingers 82 are mounted in the reciprocating table 15 and engage the edge of the pallet 44 to hold the pallet in position over the pallet support arms.

The reciprocating table 15 is actuated by a suitably mounted fluid power actuated cylinder 85 which is supplied with power fluid in timed sequence with the operation of the entire machine so that the reciprocating table 15 is moved to its extreme positions only after the pallet 44 and a molded but uncured block 84 rests thereon.

The turn tables 13 and 14 as here shown are designed for manual operation, but it is to be understood that they may be power operated in timed sequence by any suitable type of power actuated devices.

Operation of the machine

The operation of the above described machine will be best understood by reference to Fig. 2. As shown here, the mold box 21 is in its open position and the pallet 44 which is to close the bottom thereof is located below it and is supported on the reciprocating table 15 directly above the pallet support arms 45 and 46. At the extreme left of this view will be seen the pallet 44 carrying an uncured block 84. This pallet 44 formerly had closed the bottom of the mold box 21 but has been lowered to rest on the end of the reciprocating table 15 with the molded but uncured block 84 thereon. As here shown, the pallet 44 with the molded but uncured block thereon has been moved with the reciprocating table 15 away from the position directly beneath the mold box 21 which it had occupied immediately after its removal from the said mold box.

As will be seen from the position of the block 84, as shown in this figure, the pallet 44 and the block 84 have not been turned on the turntable 14 but are in position to be turned thereon for movement along the track 17 to the curing racks (not shown). As shown in this view, another pallet 44 has been placed on the table 15, preferably by insertion between the guides 47, while the table 15 is in position so that the member 82 underlies the closed mold box 20. When the table 15 moves to the position here shown, the pallet 44 is brought into position under mold box 21 and is ready to be raised to close the bottom of the said mold box.

It is to be understood that while the present disclosure does not show an automatic means for supplying the pallet 44 from a pallet supply to the table 15, such operation may be employed, if desired. Such pallet feed mechanisms are well known in this art and any suitable conventional type may be employed herewith.

The mold box 20 as shown in this figure is in position directly under the material feeding hopper 24. When the agitators 75 are rotated, the agitated concrete mix is fed through the open mouth of the hopper 24 and fills the mold box 20. Various types of conventional control devices may be employed to assure complete filling of the mold box before operation of the machine. The use of the agitators 75 in the throat of the hopper 24 has been found to be satisfactory to assure filling of the mold boxes with concrete mix. The only control needed at this point is a suitable timing control to provide such a time period as may be required to accommodate the particular size, shape and design of mold box to be used.

The timing control also stops the mold box vibration and the hopper agitators, should the mold box be sufficiently filled and packed before the other steps in the cycle being performed on mold box 21 are completed.

As soon as the pallet 44 is clamped against mold box 21 and the mold box 20 is filled, the power cylinder 41 is actuated to move the mold box 20 to a position directly below the finishing head 22. This is accomplished by moving the entire mold supporting carriage on the moveable ways 31 and 32. This movement carries the gate 40 across the mouth of the filling hopper 24 and prevents discharge of the concrete mix from the hopper 24 during this movement of the mold boxes.

When the mold boxes are moved to the right as viewed in Fig. 2 until the mold box 21 occupies the position shown for mold box 20, the mold box 21 will be in the filling position here shown as occupied by the mold box 20. The mold box 21 will then be filled while the molding of the material in the mold box 20 is being completed at the finishing station. The table 15 remains in the position here shown until the finishing operation is completed in the mold box 20 and the pallet 44 has been removed therefrom and deposited on the table 15 with its edge in contact with the stop 83.

When the mold box 20 has been moved to the right from its position as shown in Fig. 2 to the finishing station, it is directly under the finishing head 22 and directly over the end of the table 15. When in this position, the power cylinder 72 is actuated and the finishing head 22 is moved into the mold box 20. This movement results in smoothing the surface of the concrete mix in the mold box and because the entire mold is still vibrating results in further packing the top of the block.

When the desired amount of molding and compaction has been completed, the pallet holding arms 45 and 46 are actuated by the power cylinder 53 to move them away from the bottom of the mold box 20 while a pressure is exerted through the finishing head 22 on the material in the box. Thus, in the machine of the present invention, the finishing heads 22 and 23, in addition to retaining the material in the mold boxes during the finish molding operations also assist in stripping the uncured, compacted material from the mold.

One complete cycle of the machine is as follows:

When the pallet 44 carrying a compacted block 84 has been removed from the mold box 20 and has been deposited on the reciprocating table 15 and held in position thereon by the stop 83a, cylinder 85 is actuated to drive table 15 to the right from the position shown in Fig. 2. This moves the pallet and block to a position on the right over turntable 13. The new pallet 44 has previously been deposited on table 15 and held in position by the stop 82a and is subsequently raised by arms 45 and 46 so that it closes the underside of mold box 20. Simultaneously cylinder 72 raises the finishing head 22 so that it is clear of mold box 20.

At this time cylinder 41 moves both mold boxes to the left and the mold boxes then occupy the positions shown in Fig. 2.

Cylinder 72 then lowers finishing head 23 to retain the concrete in mold box 21, and to facilitate smoothing the top surfaces of the material in mold box 21. While this is going on and in some cases until the mold boxes are again ready to be moved, the filling and packing operation is going on in the mold box 20.

When the smoothing and final packing is completed in mold box 21, then arms 45 and 46 are lowered and simultaneously sufficient pressure is exerted by left hand cylinder 72 on pressure head 23 to strip the finished block from mold box 21, depositing it upon reciprocating table 15.

Then cylinder 85 moves reciprocating table 15 to the extreme left position depositing a pallet 44 with its compacted block 84 on turntable 14. A new pallet 44 is then placed on table 15 directly below mold box 21.

In Fig. 2, the finishing head 23 is in the mold box 21 in the position it occupies just after the pallet 44 has been removed and the block stripped from the mold. After the block has been stripped from the mold and before movement of the mold boxes to the right as above described, the cylinder 72 is actuated to raise the finishing head 23 from the mold box 21 before the cylinder 41 is actuated to move the mold box carriage on the sliding ways 32 and 33.

During the filling, packing, smoothing operations, the mold box and the material therein have been vibrated thus densifying the mix in the boxes and assuring the filling of the boxes with a minimum of entrapped air in the material therein. By continuing the vibration during the time that the mold boxes are moved from the filling and packing station to the finishing station where the material is smoothed, further densified and then stripped from the mold, I am able to secure an increased amount of vibration without retarding the machine cycle as has heretofore been required in machines of the reciprocating mold box type where the vibration was separately applied to the filled mold box on a vibrating table and then separately applied to the compression head. The machine of the present invention produces a product of unusual uniformity throughout and of such a density that satisfactory finishing can be achieved in a shortened period and with less power required.

Another feature of the present invention is that two blocks of different sizes may be made at the same time by merely providing the mold boxes of the desired size and shape. This is of particular value to the concrete products manufacturer who is required to manufacture blocks of different sizes and who, for economic reasons does not desire to have a separate machine for each size of block required.

While I have here shown and described a machine of the multiple mold type as a preferred embodiment of the present invention, it is to be understood that the invention may also be applied to a single mold machine in which the mold box is vibrated and moved bodily during the operative cycle of the machine.

Having thus described my invention, I claim:

1. A molding machine comprising a material feed hopper, a finishing head spaced from said feed hopper, a movable mold box spaced beneath the discharge end of said hopper, means for mounting said mold box for reciprocation between the discharge end of said feed hopper and said finishing head, timed power means for moving said mold box and actuating said finishing head and a vibrator connected with said mold box and bodily movable therewith, control means to effect a continuous vibration of said mold box by said vibrator during the filling thereof while under the said material hopper, during transfer of the mold box from said hopper to said finishing head, and during the compaction of the material therein while in contact with said finishing head.

2. A molding machine as claimed in claim 1 and further characterized in that said mold box has an open bottom and a pallet which is vertically movable relative thereto to selectively open and close the bottom portion of said mold box during the filling of the mold box, during transferring of the mold box from the hopper to said finishing head and during compaction of the material therein.

3. A molding machine as claimed in claim 2 and further characterized in that a timed power actuated pallet removal unit is provided to move the lowered pallet and compressed material away from its lowered position beneath said finishing head.

4. A molding machine as claimed in claim 1 and further characterized in that said material feed hopper comprises a material supply bin having a power driven agitator in the discharge throat thereof.

5. A molding machine as claimed in claim 4 and further characterized in that said mold box has an open bottom and a removable pallet is provided which is movable vertically to selectively open and close the bottom portion of said mold box, said pallet closing the open bottom of the mold box during filling thereof, during the transferring thereof from the hopper to the finishing head and during compaction of the material therein.

6. A molding machine as claimed in claim 5 and further characterized in that timed power means are provided to raise said pallet vertically into position for closing the open bottom of said mold prior to sliding said mold box into filling position beneath said hopper and for lowering said pallet vertically to empty said mold box after completion of the molding of the material therein.

7. A molding machine as claimed in claim 1 and further characterized in that a plurality of separate mold boxes are mounted for timed reciprocation between said feed hopper and a plurality of said finishing heads, each of said mold boxes being secured to a frame member mounted for sliding movement on ways extending from a point beneath the discharge end of said feed hopper to a point beneath one of said finishing heads.

8. A molding machine as claimed in claim 7 and further characterized in that each of said mold boxes is secured to a frame member mounted for movement from a point beneath the discharge end of said feed hopper to a point beneath one of said finishing heads and in that each of said finishing heads is mounted for vertical movement relative to the top of the mold box associated therewith and in that timed power actuated means are provided for lowering said finishing head to assist in compacting the material in the mold box when in position under said finishing head and for raising said finishing head after molding of the material has been completed.

9. A molding machine as claimed in claim 8 and further characterized in that vibrator means are attached to said frame members to effect bodily vibration of said frame members and the mold boxes attached thereto.

10. A molding machine as claimed in claim 7 and further characterized in that each of said mold boxes is open at its bottom and is provided with a removable pallet, and in that means are provided for moving a pallet into position vertically to close the bottom of one of each of said mold boxes during the filling thereof, during transferring thereof from the hopper to the finishing head, and during compaction of the material therein.

11. A molding machine as claimed in claim 10 and further characterized in that timed power means are provided to raise said pallet vertically into position for closing the open bottom of one of said mold boxes prior to moving said mold box into filling position beneath said hopper and for lowering said pallet vertically to empty said mold box after molding of the material therein while in contact with one of said finishing heads.

12. A molding machine as claimed in claim 7 and further characterized in that said mold boxes are each resiliently connected to a gate mounted for sliding movement beneath said feed hopper, said gate having a closed portion extending between said mold boxes whereby material is allowed to flow from said feed hopper only while a mold box is located thereunder.

ROBERT O. DAVIS.

REFERENCES CITED

The following references are of record in the file of this patent:

UNITED STATES PATENTS

| Number | Name | Date |
|---|---|---|
| 625,866 | Ayotte et al. | May 30, 1899 |
| 830,357 | Nesselroad | Sept. 4, 1906 |
| 930,053 | Diefendorf | Aug. 3, 1909 |
| 2,099,946 | Straub | Nov. 23, 1937 |
| 2,308,132 | Wellnitz | Jan. 12, 1943 |
| 2,341,012 | Billman et al. | Feb. 8, 1944 |
| 2,366,780 | Gelbman et al. | Jan. 9, 1945 |
| 2,431,034 | Gelbman | Nov. 18, 1947 |
| 2,446,061 | Reed | July 28, 1948 |
| 2,464,641 | Hearn, Jr. | Mar. 15, 1949 |